United States Patent
Evans, V et al.

(10) Patent No.: US 9,762,712 B2
(45) Date of Patent: Sep. 12, 2017

(54) SYSTEM AND METHOD FOR REDUCING THE NUMBER OF PORTS ASSOCIATED WITH A MOBILE DEVICE

(71) Applicant: Essential Products, Inc., Palo Alto, CA (US)

(72) Inventors: David John Evans, V, Palo Alto, CA (US); Xinrui Jiang, San Jose, CA (US); Andrew E. Rubin, Los Altos, CA (US); Matthew Hershenson, Los Altos, CA (US); Xiaoyu Miao, Palo Alto, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 0 days.

(21) Appl. No.: 15/135,431

(22) Filed: Apr. 21, 2016

(65) Prior Publication Data

US 2017/0126868 A1    May 4, 2017

Related U.S. Application Data

(60) Provisional application No. 62/249,130, filed on Oct. 30, 2015, provisional application No. 62/317,469, filed on Apr. 1, 2016.

(51) Int. Cl.
*H04M 1/02* (2006.01)
*G01J 1/42* (2006.01)
(Continued)

(52) U.S. Cl.
CPC .......... *H04M 1/026* (2013.01); *G01J 1/4204* (2013.01); *G01S 17/08* (2013.01); *H04B 10/2503* (2013.01)

(58) Field of Classification Search
CPC .... G02B 6/4246; G02B 6/4298; H04B 10/43; H04B 10/40; H04B 10/2503; H04B 10/2504; H04M 1/026; G01J 1/4204
See application file for complete search history.

(56) References Cited

U.S. PATENT DOCUMENTS

| 4,720,706 A | 1/1988 | Stine |
| 4,800,404 A | 1/1989 | Ginsburg et al. |

(Continued)

OTHER PUBLICATIONS

Evans V , et al., International Search Report and Written Opinion mailed Mar. 10, 2017 in PCT application No. PCT/US16/58791; 8 pages.
(Continued)

*Primary Examiner* — Michael P Lapage
(74) *Attorney, Agent, or Firm* — Perkins Coie LLP (57) ABSTRACT

The technology presented here reduces the number of ports associated with the mobile device by combining a plurality of ports into a single multipurpose port. In one embodiment, the multipurpose port includes multiple sensors that detect various properties associated with a light beam, and a light guide that transmits the light beam between the environment outside and the multiple sensors inside the mobile device. In another embodiment, a multipurpose camera includes one or more pixels, different from the rest of the multipurpose camera pixels, where the one or more pixels receive a unique control signal. The unique control signal, sent by a processor coupled to the multipurpose camera, includes an instruction to perform an action different from the rest of the pixels, e.g., to turn on when the rest of the pixels are off. The active pixels can detect coarse properties of the light while saving mobile device battery life.

16 Claims, 8 Drawing Sheets

(51) Int. Cl.
*G01S 17/08* (2006.01)
*H04B 10/25* (2013.01)

(56) References Cited

U.S. PATENT DOCUMENTS

| | | | |
|---|---|---|---|
| 5,466,926 A | 11/1995 | Sasano et al. | |
| 5,698,861 A | 12/1997 | Oh et al. | |
| 6,054,707 A | 4/2000 | Hou et al. | |
| 6,087,653 A | 7/2000 | Van Schyndel et al. | |
| 6,867,821 B2 | 3/2005 | De Schipper | |
| 7,071,456 B2* | 7/2006 | Poplin | G01J 1/42 |
| | | | 250/214 AL |
| 8,103,118 B2 | 1/2012 | Foo et al. | |
| 8,638,317 B2 | 1/2014 | Harada et al. | |
| 8,867,015 B2 | 10/2014 | Posner et al. | |
| 9,057,931 B1 | 6/2015 | Baldwin | |
| 2004/0212555 A1 | 10/2004 | Falco | |
| 2005/0152024 A1 | 7/2005 | Awaya et al. | |
| 2007/0002130 A1 | 1/2007 | Hartkop | |
| 2007/0188650 A1 | 8/2007 | Kobayashi et al. | |
| 2008/0165267 A1 | 7/2008 | Cok | |
| 2008/0199127 A1* | 8/2008 | Lowles | G02B 6/4246 |
| | | | 385/12 |
| 2010/0019972 A1 | 1/2010 | Evans et al. | |
| 2010/0060611 A1 | 3/2010 | Nie | |
| 2010/0299390 A1 | 11/2010 | Alameh et al. | |
| 2011/0007102 A1 | 1/2011 | Ogura et al. | |
| 2011/0121950 A1 | 5/2011 | Izadi et al. | |
| 2011/0248155 A1 | 10/2011 | Chen | |
| 2012/0092461 A1 | 4/2012 | Fisker et al. | |
| 2012/0132806 A1* | 5/2012 | Findlay | G01J 1/0266 |
| | | | 250/338.1 |
| 2012/0321149 A1 | 12/2012 | Carver et al. | |
| 2013/0048837 A1* | 2/2013 | Pope | G01J 1/0422 |
| | | | 250/214.1 |
| 2013/0053106 A1 | 2/2013 | Kwong et al. | |
| 2013/0153772 A1* | 6/2013 | Rossi | G01S 17/026 |
| | | | 250/353 |
| 2013/0278576 A1* | 10/2013 | Lee | G09G 3/20 |
| | | | 345/207 |
| 2013/0320862 A1 | 12/2013 | Campbell et al. | |
| 2014/0065547 A1 | 3/2014 | Arita | |
| 2014/0168864 A1* | 6/2014 | Lin | G02F 1/133308 |
| | | | 361/679.01 |
| 2014/0218772 A1 | 8/2014 | Koshimizu et al. | |
| 2014/0275850 A1 | 9/2014 | Venkatraman et al. | |
| 2014/0333928 A1* | 11/2014 | Erdtmann | G08B 17/107 |
| | | | 356/338 |
| 2015/0063821 A1* | 3/2015 | Mathews | H04B 10/116 |
| | | | 398/139 |
| 2015/0156855 A1 | 6/2015 | Graham et al. | |
| 2015/0271392 A1 | 9/2015 | Musgrave et al. | |
| 2016/0153903 A1 | 6/2016 | Ono | |
| 2016/0162732 A1 | 6/2016 | Suzuki et al. | |
| 2016/0239093 A1 | 8/2016 | Chua et al. | |

OTHER PUBLICATIONS

Evans V, et al., International Search Report and Written Opinion mailed Mar. 10, 2017 in PCT application No. PCT/US16/58791; 8 pages.

Non-Final Office Action dated Apr. 17, 2017, for U.S. Appl. No. 15/288,925, filed Oct. 7, 2016.

Notice of Allowance dated Jul. 5, 2017, for U.S. Appl. No. 15/288,925, filed Oct. 7, 2016.

* cited by examiner

SYSTEM AND METHOD FOR REDUCING THE NUMBER OF PORTS ASSOCIATED WITH A MOBILE DEVICE

CROSS-REFERENCE TO RELATED APPLICATIONS

This application claims priority to the U.S. Provisional Patent Application Ser. No. 62/249,130, filed Oct. 30, 2015, and to the U.S. Provisional Patent Application Ser. No. 62/317,469, filed Apr. 1, 2016, which are incorporated herein by reference in their entirety.

TECHNICAL FIELD

The present application is related to mobile devices and, more specifically, to methods and systems that reduce the number of ports associated with the mobile device, by combining functionality of multiple ports into a single multipurpose port.

BACKGROUND

Mobile devices contain a plurality of different ports, which correspond to a plurality of devices, such as the camera, the fingerprint sensor, the speakers, the microphone, the proximity sensor, the ambient light sensor, etc. Each port requires a dedicated aperture formed in the mobile device casing, a dedicated circuit on the motherboard, a dedicated wiring between the hole in the mobile device casing and the circuit on the motherboard, etc. Each additional port increases the cost of manufacturing the mobile device. Further, each additional port increases the probability of a foreign substance getting inside the mobile device, such as dust or water, disrupting the operation of the mobile device circuitry.

SUMMARY

The technology presented here reduces the number of ports associated with the mobile device by combining a plurality of ports into a single multipurpose port.

According to one embodiment, the multipurpose port includes multiple sensors that have previously required separate ports, such as a proximity sensor, an ambient light sensor, a camera, a range finder, a fingerprint sensor, etc. The plurality of sensors detect various properties associated with a beam of light, such as color, intensity, and/or time of travel of the light beam. The multipurpose port further includes a light guide to transmit a beam of light between the environment outside the mobile device and the multiple sensors inside the mobile device. The light guide can take any shape, and thus enables flexible positioning of the multipurpose port on the mobile device.

According to another embodiment, a multipurpose camera includes one or more pixels different from the rest of the multipurpose camera pixels, where the one or more pixels receive a unique control signal. The unique control signal, sent by a processor coupled to the multipurpose camera, includes an instruction to perform an action different from the rest of the pixels, such as to turn on when the rest of the pixels are off. By turning on one or more pixels when the remainder of the pixels are off, the active pixels can detect coarse properties of the light, such as ambient light intensity, while saving mobile device battery life.

DETAILED DESCRIPTION

The technology presented here reduces the number of ports associated with the mobile device by combining a plurality of ports into a single multipurpose port.

According to one embodiment, the multipurpose port includes multiple sensors, that have previously required separate ports, such as a proximity sensor, an ambient light sensor, a camera, a range finder, a fingerprint sensor, etc. The plurality of sensors detect various properties associated with a beam of light, such as color, intensity, and/or time of travel of the light beam. The multipurpose port further includes a light guide to transmit a beam of light between the environment outside the mobile device and the multiple sensors inside the mobile device. The light guide can take any shape, and thus enables flexible positioning of the multipurpose port on the mobile device.

According to another embodiment, a multipurpose camera includes one or more pixels different from the rest of the multipurpose camera pixels, where the one or more pixels receive a unique control signal. The unique control signal, sent by a processor coupled to the multipurpose camera, includes an instruction to perform an action different from the rest of the pixels, such as to turn on when the rest of the pixels are off. By turning on one or more pixels when the remainder of the pixels are off, the active pixels can detect coarse properties of the light, such as ambient light intensity, while saving mobile device battery life.

In various embodiments the light guide can be an optical fiber cable, a light pipe, a liquid light guide, a sound guide or any material configured to efficiently transmit a wave signal such as light and/or sound. Further, different sensors disclosed herein can be combined in various ways, such as combining two or more sensors into a single multipurpose port.

Multipurpose Port

Presented here is a system and method configured to reduce the number of ports associated with a mobile device. A mobile device includes an outer casing, which includes a display area, a number of ports, a plastic cover, etc. The technology presented here reduces the number of ports associated with the mobile device by combining a plurality of ports into a single port.

Figure 1:
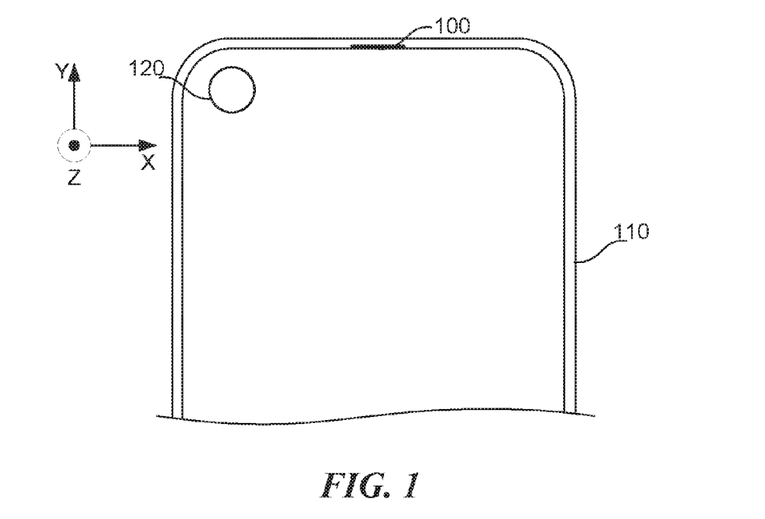
FIG. 1 shows a multipurpose port disposed on a mobile phone, according to one embodiment.

FIG. 1 shows a multipurpose port disposed on a mobile phone, according to one embodiment. The port 100 includes an entry point disposed on the outer casing associated with the mobile device 110. The port 100 can be disposed on the front, on the back, or on the sides associated with the mobile device 110. The port 100 can comprise a plurality of ports disposed anywhere on the mobile device 110, such as two ports disposed on opposite sides of the mobile device, six ports disposed on each side of the mobile device, etc. The port 100 can be disposed on one or more pixels in a multipurpose camera 120 associated with the mobile device. The port 100 can be disposed proximate to the multipurpose camera 120. The entry point of the port 100 is configured to receive a first light beam and to emit a second light beam, where a frequency associated with the first light beam and the second light beam spans the full frequency range of the electromagnetic spectrum.

Figure 2:
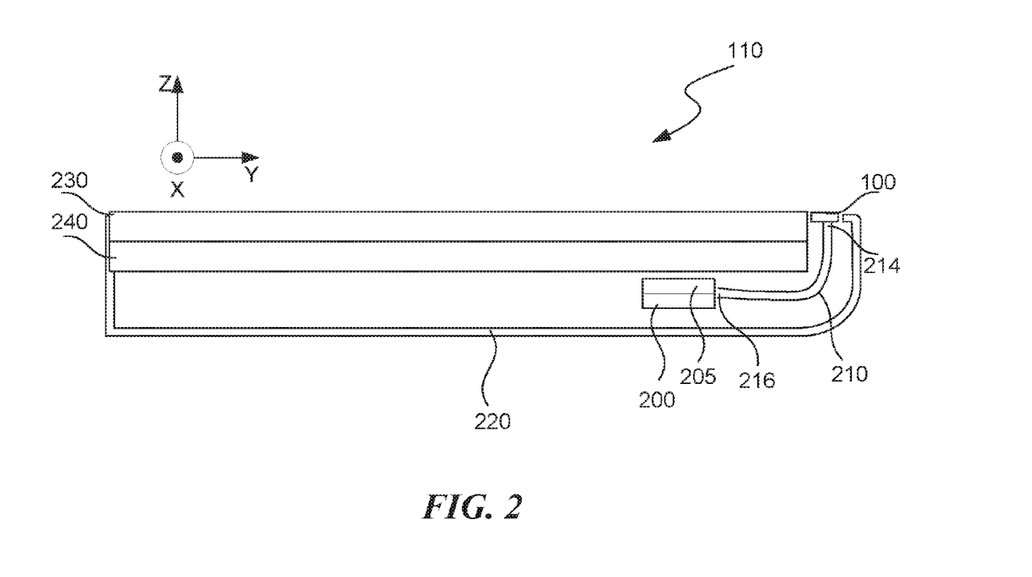
FIG. 2 shows a placement of the multipurpose port inside the mobile device, according to one embodiment.

FIG. 2 shows a placement of the multipurpose port inside the mobile device, according to one embodiment. FIG. 2 is the Y cross-section view of the mobile device 110. Element 220 is the outer casing associated with the mobile device 110. Element 230 is the glass associated with the mobile device 110, and element 240 is the touch display module associated with the mobile device 110. The port 100 includes a light guide 210, and a plurality of sensors 200, 205 associated with an exit point of the port 100.

The light guide 210 transmits a signal between an entry point 214 and an exit point 216 associated with the light guide 210. In various embodiments disclosed herein, the light guide 210 comprises a tunnel that transmits the signal between the entry point 214 and the exit point 216. The signal can be any kind of a wave signal such as an electromagnetic wave, and/or a sound wave. The light guide 210 comprises a material that totally internally reflects the electromagnetic wave and/or the sound wave, such as acrylic resin, polycarbonate, epoxy, glass, etc. The entry point 214 is disposed on an outer surface associated with the mobile device 110, while the exit point 216 is disposed inside the mobile device 210.

According to one embodiment, the light guide 210 comprises a plurality of light guides, such as a first light guide and a second light guide, where each component light guide can have a dedicated functionality, or function the same as other component light guides. The first light guide transmits a first signal from the entry point 214 to a first sensor 200. The second light guide transmits a second signal from an emitter associated with a second sensor 205 to the entry point 214. In another embodiment, the second light guide further transmits a third signal from the entry point 214 to a receiver associated with the second sensor 205. In various embodiments, the light guide 210 can be an optical fiber cable, a light pipe, a liquid light guide, a sound guide or any material configured to efficiently transmit the signal such as light and/or sound between the entry point 214 and the exit point 216.

The light guide 210 enables flexible placement of the entry point 214 and the exit point 216. The light guide 210 can take on any shape connecting the entry 214 and the exit point 216 of the port 100. The exit point 216, including the plurality of sensors 200, 205, can be disposed on the circuit board associated with the mobile device 110, beneath the display associated with the mobile device 110, on a pixel in a camera associated with the mobile device 110, etc.

The light guide 210 can comprise a lens associated with either the entry point 214 or the exit point 216. The lens can be a short focal length lens, or a long focal length optical lens.

The plurality of sensors 200, 205 are coupled to the light guide 210. The plurality of sensors 200, 205 are configured to detect a plurality of properties associated with the signal, such as a frequency, an intensity, a change in the frequency, a change in the intensity, a time of flight associated with the signal, etc. The plurality of sensors 200, 205 comprise at least two sensors, such as an ambient light sensor, a proximity sensor, a flash, a range finder, a fingerprint sensor, a camera, a speaker, and a microphone. The plurality of sensors 200, 205 can emit and receive light. The emitted and received light can span the full electromagnetic spectrum. For example, sensor 200 can be an infrared range finding sensor.

According to one embodiment, the sensor 200 is an ambient light sensor 200, and sensor 205 is a proximity sensor. The ambient light sensor 200 is configured to detect a plurality of properties associated with the first light beam, such as color, intensity, change in color and intensity, gestures, etc. The proximity sensor 205 includes an emitter configured to emit the second light beam and a receiver configured to receive the second light beam reflected off an object. The proximity sensor 205 is configured to measure a distance to the object, such as by measuring the time of flight for the emitted light, i.e., the time between the emission of the second light beam and measurement of the second light beam at the receiver associated with the proximity sensor 205.

Figure 3:
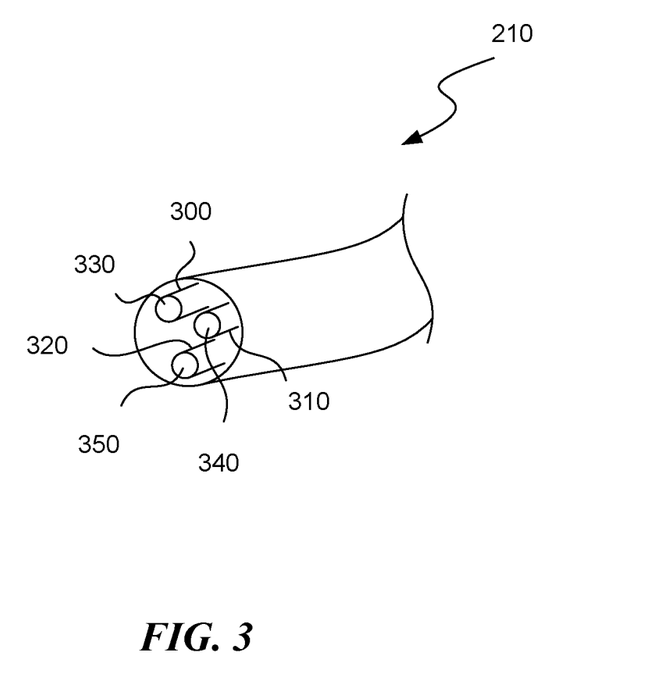
FIG. 3 shows the components of the light guide, according to one embodiment.

FIG. 3 shows the components of the light guide, according to one embodiment. The light guide 210 can comprise component light guides 300, 310, 320. Light guide 300 is configured to transmit the first light beam from the entry point of the port 100 to the ambient light sensor 200. Light guide 310 is configured to transmit the second light beam from the emitter associated with the proximity sensor 205 to the entry point of the port 100. Light guide 320 is configured to transmit a third light beam from the entry point of the port 100 to the receiver associated with the proximity sensor 205. The proximity sensor 205 can be configured to, based on the object proximity, detect gestures.

Each light guide 300, 310, 320 can have an optical lens 330, 340, 350, respectively, where the optical lens 330, 340, 350 is associated with the entry point of the light guide 300, 310, 320. The optical lens 330, 340, 350 can be associated with the exit point of the light guide 300, 310, 320. The optical lens 330 associated with the ambient light sensor light guide 300 can have a short effective focal length, i.e., the lens 330 can be configured to focus light beams from a wide field of view. For example, the optical lens 330 can be a dome lens. The optical lens 350 associated with the proximity sensor receiver light guide 320 can have a long effective focal length, i.e., the lens 350 can be configured to focus light beams from a narrow field of view. The lenses 330, 340, 350 can comprise one or more lenses.

According to another embodiment, the light guide 210 can comprise two light guides 300, 310. Light guide 300, same as above, transmits the first light beam to the ambient light sensor 200. Light guide 310 is configured to transmit the second light beam from the emitter associated with the proximity sensor 205 to the entry point of the port 100. Further, the light guide 310 is also configured to transmit a third light beam from the entry point of the port 100 to the receiver associated with the proximity sensor 205. The optical lens 330 associated with the ambient light sensor guide 200 is the same as described above. The optical lens 340 associated with the light guide 310 can have a long effective focal length.

According to another embodiment, the light guide 210 can comprise only one light guide 300, configured to transmit the first light beam to the ambient light sensor 200. The ambient light sensor 200 can be configured to detect change in the ambient light, and based on the change in the ambient light, the ambient light sensor 200 can detect the proximity of an object.

Figure 4:
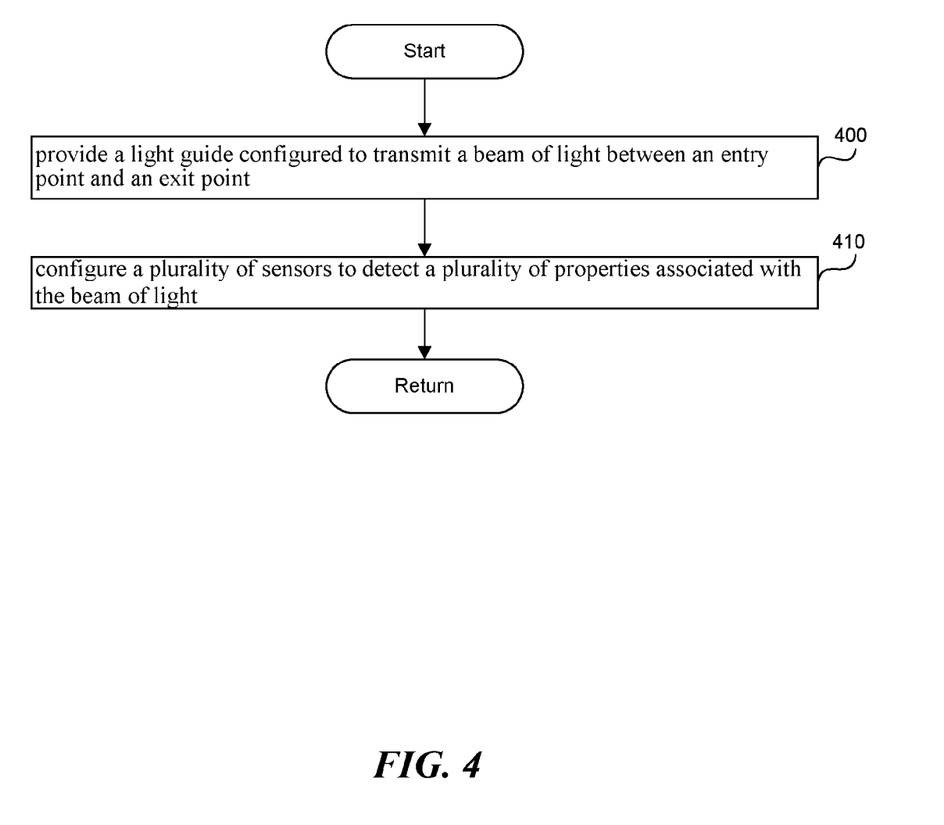
FIG. 4 is a flowchart of a method to minimize a number of ports associated with the mobile device, according to one embodiment.

FIG. 4 is a flowchart of a method to minimize a number of ports associated with the mobile device 110, according to one embodiment. In step 400, a light guide is provided and configured to transmit a beam of light between an entry point 214 and an exit point 216, as described above. In step 410 a plurality of sensors, coupled to the light guide, is configured to detect a plurality of properties associated with the beam of light. As described above, the plurality of sensors comprise at least two of an ambient light sensor, a proximity sensor, a flash, a range finder, a fingerprint sensor, and a camera. The plurality of properties associated with the beam of light include a color associated with the beam of light, an intensity associated with the beam of light, a change in the color associated with the beam of light, a change in the intensity associated with the beam of light, and/or a time of flight associated with the beam of light.

According to one embodiment, the light guide can comprise any one of a short focal length optical lens and a long focal length optical lens. The light guide can be disposed on a pixel on a camera associated with the mobile device.

In another embodiment, the light guide can be configured to transmit sound by shaping the light guide to totally internally reflect sound, and by making the light guide out of the material that tends to totally internally reflect sound. The light guide can be used to transmit sound only, or the light guide can be used to transmit both sound and light. When the light guide is configured to transmit sound, the plurality of sensors can include a microphone and a speaker.

According to one embodiment, the first light guide is provided where the first light guide includes a first tunnel configured to transmit a first light beam from the entry point 214 to a first sensor in the plurality of sensors. A second light guide is provided including a second tunnel configured to transmit a second light beam from an emitter associated with a second sensor in the plurality of sensors to the entry point. The second tunnel can be further configured to transmit a third light beam from the entry point to a receiver associated with the second sensor in the plurality of sensors.

Multipurpose Camera

Figure 5A:
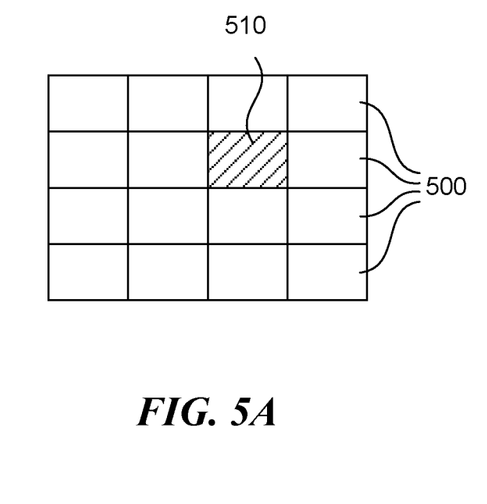
FIG. 5A shows a sensor integrated into a mobile device multipurpose camera, according to one embodiment.

FIG. 5A shows a sensor integrated into a mobile device multipurpose camera, according to one embodiment. In FIG. 5A, only the rows of pixels are labeled "500," for brevity. The mobile device 110 comprises a multipurpose camera 120, shown in FIG. 1, and a processor coupled to the multipurpose camera 120. The multipurpose camera 120 comprises a plurality of pixels 500 that record an image, such as CCD or CMOS sensors. The multipurpose camera 120 comprises one or more pixels 510 in the plurality of pixels 500, which are configured to receive a unique control signal. The one or more pixels 510 are configured to receive a light beam and transmit information associated with the light beam to a processor associated with the mobile device 110. The light beam can span the full electromagnetic spectrum and include wavelengths such as infrared and visible light.

The unique control signal includes an instruction to perform an action different from a remainder of the plurality of pixels 500, such as to turn on while the remainder of the plurality of pixels 500 are turned off, to receive a beam of light, to send a beam of light, etc. The unique control signal can come from a processor associated with the multipurpose camera 120, or the processor associated with the mobile device 110. The processor is configured to send the unique control signal to one or more pixels 510 via the 12C bus. The unique control signal can include an ID associated with the one or more pixels 510, and an instruction causing the pixel to turn on, to turn off, or to turn on in a specific mode, such as the ambient light sensor mode, a proximity sensor mode, etc.

The processor, coupled to the mobile device 110 and to the multipurpose camera 120, is configured to receive the information associated with a light beam, to detect a plurality of properties associated with the light beam, and to detect changes in the plurality of properties associated with the light beam. The plurality of properties includes a frequency associated with the light beam, an amplitude associated with the light beam, a change in the frequency associated with the light beam, a change in the amplitude associated with the light beam, and/or a time of flight associated with the light beam. The frequency associated with the light beam spans the full electromagnetic spectrum. The processor can further be configured to, based on the detected changes in the plurality of properties associated with the light beam, determine at least one of: a motion associated with an object, a gesture associated with an object, a proximity associated with an object, etc.

According to one embodiment, the plurality of pixels 500 is configured to turn off to save power. Turning off can include the plurality of pixels 500 not using any power, or the plurality of pixels 500 going into a standby mode where the pixels produce no readout. One or more pixels 510, in the plurality of pixels 500, are configured to detect ambient light. The pixels 510 can be constantly on, while the rest of the pixels 500 are turned off, or can receive a unique control signal, as described above. By keeping only one pixel on, and turning the rest of the pixels off, the mobile device 110 saves a significant amount of power. The one or more pixels 510 are configured to receive a light beam and transmit information associated with the light beam to a processor associated with the mobile device 110.

According to another embodiment, the multipurpose camera 120 can act as a fingerprint sensor. The multipurpose camera 120 includes an outer layer that detects contact between an object and the multipurpose camera 120, the plurality of pixels 500 that record an image of the object, and a processor. The processor can be associated with the multipurpose camera 120, or the processor can be associated with the mobile device 110. The outer layer can detect contact by detecting capacitance changes in the outer layer. Once the contact is detected, the plurality of pixels 500 records an image of the object and sends it to the processor, such as via an I2C bus. The processor compares the image of the object with a stored image. When the recorded image matches the stored image, the processor authenticates the object. The match is performed within a specified tolerance, such as the recorded image is authenticated when the recorded image matches the stored image to at least 95% accuracy.

Figure 5B:
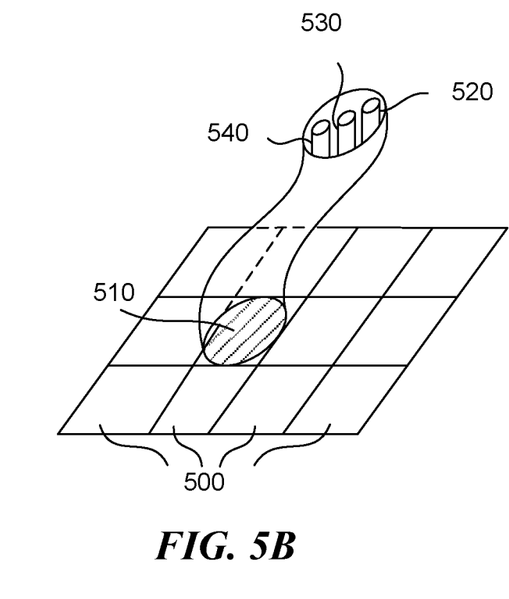
FIG. 5B shows a light guide integrated into a mobile device multipurpose camera, according to one embodiment.

FIG. 5B shows a light guide integrated into a mobile device multipurpose camera, according to one embodiment. The mobile device multipurpose camera 120 can be any camera associated with the mobile device, such as a front facing camera, a back facing camera, or a 360° camera. One or more pixels 510 further comprise at least one light guide

520. The light guide 520 comprises a material that totally internally reflects a beam of light. The light guide 520 comprises a tunnel that transmits the light beam between one or more pixels 510 and the exterior of the mobile device 110. One or more pixels 510 are coupled to a processor configured to send a unique control signal to the one or more pixels 510, where the unique control signal comprises an identification associated with the one or more pixels 510, and an instruction to perform an action different from a remainder of the plurality of pixels, the action comprising any of receiving a beam of light, sending the beam of light, an instruction to turn on, an instruction to turn off, an instruction to enter into a specific operation mode, etc.

According to one embodiment, the light guide 520 comprises a tunnel that emits the beam of light and that receives a reflected beam of light, and a processor that detects the time of flight associated with a beam of light. Frequency associated with a beam of light can span the full electromagnetic spectrum, such as infrared frequency, visible light frequency, etc. By detecting the time of flight, the processor can measure a distance to an object, thus acting as a range finder integrated into the multipurpose camera 120, a proximity sensor integrated into the multipurpose camera 120, etc.

According to another embodiment, the light guide 520 emits a flashlight to enable the plurality of pixels 500 to record the image. In this embodiment, the flashlight is built into the multipurpose camera 120, thus enabling a front facing camera with a flash.

In another embodiment, one or more pixels 510 include an ambient light sensor and a first light guide 520 coupled to the ambient light sensor. The first light guide 520 includes an entry point and an exit point, the exit point of the first light guide 520 coupled to the ambient light sensor. The first light guide 520 is configured to receive the first light beam at the entry point and to transmit the first light beam to the exit point. The ambient light sensor is configured to receive the first light beam and to detect a plurality of properties associated with the first light beam. The plurality of properties associated with the first light beam includes color, intensity, and change in color and intensity. The ambient light sensor can be configured to, based on the detected changes in the plurality of properties associated with the first light beam, determine at least one of: a motion associated with an object, a gesture associated with an object, and a proximity associated with an object. In another embodiment, the processor can be configured to, based on the detected changes in the plurality of properties associated with the first light beam, determine at least one of: a motion associated with an object, a gesture associated with an object, and a proximity associated with an object.

According to another embodiment, one or more pixels 510, in addition to the ambient light sensor and the first light guide 520, as described above, include a proximity sensor, and a second light guide 530 coupled to the proximity sensor. The proximity sensor includes an emitter configured to emit a second light beam and a receiver configured to receive the second light beam reflected off an object. Further, the proximity sensor is configured to detect a distance to an object, such as by measuring the time of flight for the emitted light, i.e., the time between the emission of the first light beam and measurement of the first light beam at the receiver associated with the proximity sensor. The second light guide 530 includes an entry point and an exit point. The exit point of the second light guide 530 is coupled to the emitter associated with the proximity sensor. The second light guide 530 is configured to transmit a second light beam from the emitter associated with the proximity sensor to the entry point of the second light guide 530.

According to one embodiment, the exit point of the second light guide 530 can be coupled to the receiver associated with the proximity sensor. The second light guide 530 is configured to transmit the reflected second light beam to the receiver associated with the proximity sensor. Alternatively, according to another embodiment, the one or more pixels 510 include a third light guide 540 comprising an entry point and an exit point, the exit point of the third light guide 540 coupled to the receiver associated with the proximity sensor. The third light guide 540 is configured to transmit the second light beam reflected off an object to the receiver associated with the proximity sensor.

Figure 6:
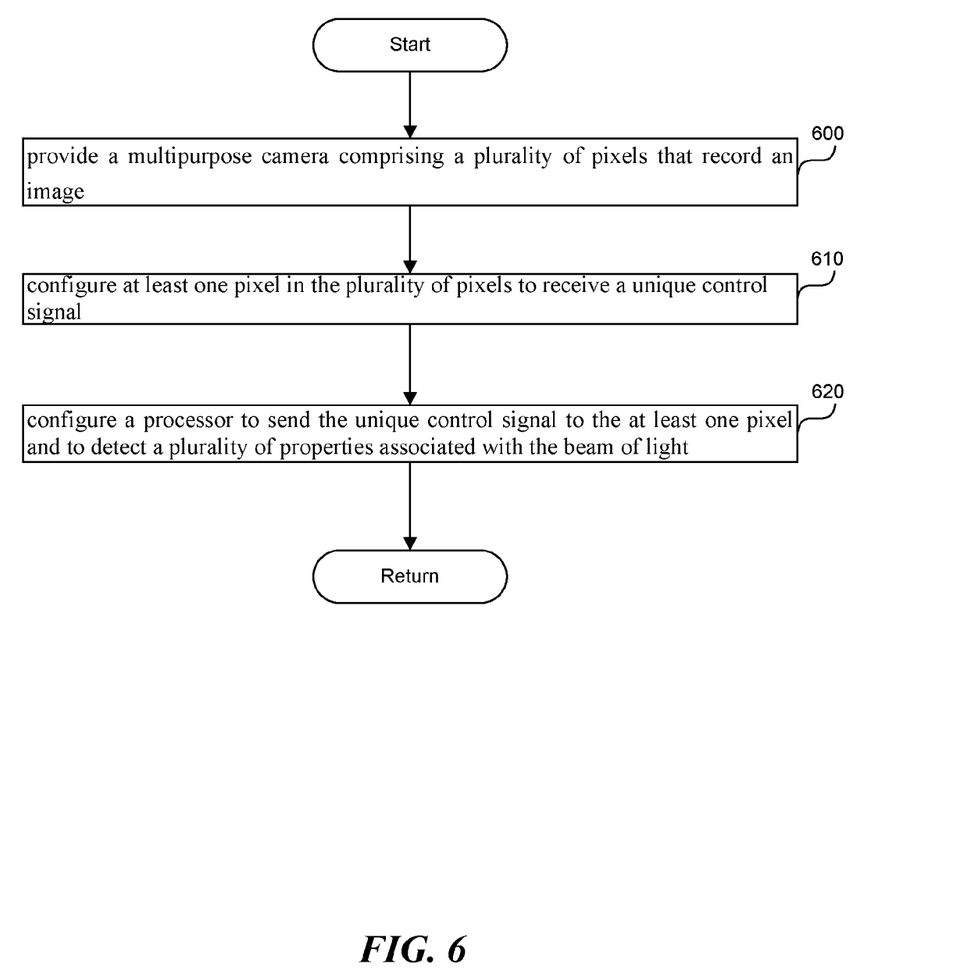
FIG. 6 is a flowchart of a method to reduce a number of ports associated with a mobile device, according to one embodiment.

FIG. 6 is a flowchart of a method to reduce a number of ports associated with a mobile device, according to one embodiment. In step 600, a multipurpose camera is provided, where the multipurpose camera includes a plurality of pixels that record an image. In step 610, one or more pixels in the plurality of pixels are configured to receive a unique control signal, the unique control signal including an identification associated with the one or more pixels, and an instruction to perform an action different from a remainder of the plurality of pixels, such as receiving a beam of light, sending the beam of light, etc. In step 620, a processor, coupled to the multipurpose camera, is configured to send the unique control signal to the one or more pixels and to detect a plurality of properties associated with the beam of light, such as a frequency associated with the beam of light, an amplitude associated with the beam of light, a change in the frequency associated with the beam of light, and/or a change in the amplitude associated with the beam of light, etc.

According to one embodiment, the one or more pixels can include a light guide, where the light guide comprises a material that totally internally reflects the beam of light. The light guide can be configured to emit a flashlight to enable the plurality of pixels to record the image.

According to another embodiment, the light guide can be configured to emit a beam of light and to receive a reflected beam of light. The processor can be configured to detect a time of flight associated with the beam of light, and as a result act as an infrared rangefinder, a laser rangefinder, a proximity sensor, etc.

In one embodiment, an outer layer detects a contact between an object and the multipurpose camera. When the contact between the object and the multipurpose camera is detected, the plurality of pixels records the image of the object. The processor compares the image of the object with a stored image. When the image matches the stored image, the processor authenticates the object. This method can be used to authenticate a user such as by fingerprint recognition.

In another embodiment, an ambient light sensor is provided that receives a first light beam and detects the plurality of properties associated with the first light beam, as described above. In addition, a first light guide is provided that includes an entry point and an exit point, where the exit point of the first light guide is coupled to the ambient light sensor. The first light guide includes a first tunnel that receives the first light beam at the entry point, and that transmits the first light beam to the exit point.

According to one embodiment, a proximity sensor, configured to detect a distance to an object, is provided. The proximity sensor includes an emitter that emits a second light beam and a receiver that receives the second light beam. A second light guide is provided that includes an entry point and an exit point, the exit point of the second light guide coupled to the emitter and the receiver associated with the proximity sensor. The second light guide includes a second tunnel that transmits the second light beam from the emitter associated with the proximity sensor to the entry point of the second light guide. Further, the second tunnel transmits a third light beam from the entry point of the second light guide to the receiver associated with the proximity sensor, where the third light beam is the second light beam reflected off the object.

Figure 7:
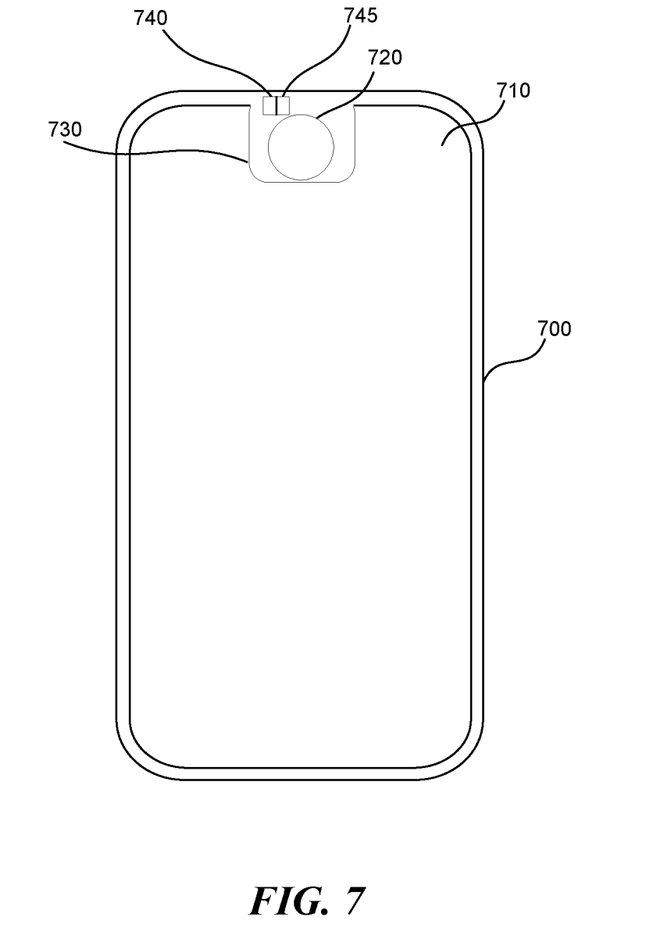
FIG. 7 shows the placement of various sensors close to the camera, according to one embodiment.

FIG. 7 shows the placement of various sensors close to the camera, according to one embodiment. Display 710 is associated with the mobile device 700, where the display 710 substantially covers a full side of the mobile device 700, and where the display 710 includes a notch 730. The notch 730 is cut out from a display stack associated with the display 710. For example, when the display stack includes a color filter layer, a liquid crystal display layer, and a thin film transistor layer, the notch 730 is cut out from the color filter layer, the liquid crystal display layer, and the thin film transistor layer. For example, when the display stack includes a color filter layer, a micro-electromechanical systems devices (MEMS) layer, and a thin film transistor layer, the notch 730 is cut out from the color filter layer, the MEMS layer, and the thin film transistor layer.

Camera 720 is associated with the mobile device 700, and placed inside the notch 730 associated with the display 710. The notch 730 also includes one or more sensors 740, 745, such as an ambient light sensor, a flash, a range finder, a fingerprint sensor, a camera, a speaker, and/or a microphone.

Figure 8:
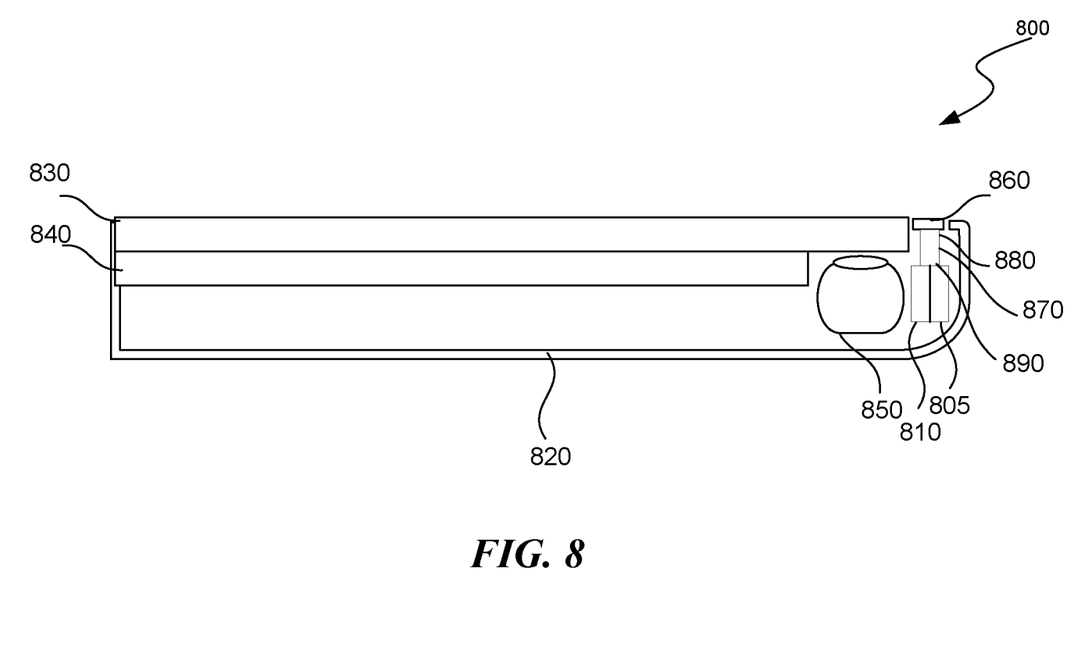
FIG. 8 shows a cross-section view of one or more sensors disposed proximate to the camera, according to one embodiment.

FIG. 8 shows a cross-section view of one or more sensors disposed proximate to the camera, according to one embodiment. Element 820 is the outer casing associated with the mobile device 800. Element 830 is the glass associated with the mobile device 800, and element 840 is the display stack with a notch associated with the mobile device 800. Camera 850 is placed inside the notch associated with the display stack 840, and beneath the glass 830. One or more sensors 860 include a light guide 870. In one embodiment, a plurality of sensors 805, 810 are associated with an exit point of the light guide 870.

The light guide 870 transmits a signal between an entry point 880 and an exit point 890 associated with the light guide 870. In various embodiments disclosed herein, the light guide 870 comprises a tunnel that transmits the signal between the entry point 880 and the exit point 890. The signal can be any kind of a wave signal such as an electromagnetic wave, and/or a sound wave. The light guide 870 comprises a material that totally internally reflects the electromagnetic wave and/or the sound wave, such as acrylic resin, polycarbonate, epoxy, glass, etc. The entry point 880 is disposed on an outer surface associated with the mobile device 800, while the exit point 890 is disposed inside the mobile device 800.

According to one embodiment, the light guide 870 comprises a plurality of light guides, such as a first light guide and a second light guide, where each component light guide can have a dedicated functionality, or function the same as other component light guides. The first light guide transmits a first signal between the entry point 880 and a first sensor 805. The second light guide transmits a second signal between an emitter associated with a second sensor 810 and the entry point 880. In another embodiment, the second light guide further transmits a third signal between the entry point 880 and a receiver associated with the second sensor 810. In various embodiments, the light guide 870 can be an optical fiber cable, a light pipe, a liquid light guide, a sound guide or any material configured to efficiently transmit the signal such as light and/or sound between the entry point 880 and the exit point 890.

The light guide 870 enables flexible placement of the entry point 880 and the exit point 890. The light guide 870 can take on any shape connecting the entry 880 and the exit point 890 of one or more sensors 860. The exit point 890, including the plurality of sensors 805, 810, can be disposed on the circuit board associated with the mobile device 800, beneath the display associated with the mobile device 800, on a pixel in a camera associated with the mobile device 800, etc.

The light guide 870 can comprise a lens associated with either the entry point 880 or the exit point 890. The lens can be a short focal length lens, or a long focal length optical lens.

The plurality of sensors 805, 810 are coupled to the light guide 870. The plurality of sensors 805, 810 are configured to detect a plurality of properties associated with the signal, such as a frequency, an intensity, a change in the frequency, a change in the intensity, a time of flight associated with the signal, etc. The plurality of sensors 805, 810 comprise at least two sensors, such as an ambient light sensor, a proximity sensor, a flash, a range finder, a fingerprint sensor, a camera, a speaker, and a microphone. The plurality of sensors 805, 810 can emit and receive light. The emitted and received light can span the full electromagnetic spectrum. For example, sensor 805 can be an infrared range finding sensor.

According to one embodiment, the sensor 805 is an ambient light sensor 805, and sensor 810 is a proximity sensor. The ambient light sensor 805 is configured to detect a plurality of properties associated with the first light beam, such as color, intensity, change in color and intensity, gestures, etc. The proximity sensor 810 includes an emitter configured to emit the second light beam and a receiver configured to receive the second light beam reflected off an object. The proximity sensor 810 is configured to measure a distance to the object, such as by measuring the time of flight for the emitted light, i.e., the time between the emission of the second light beam and measurement of the second light beam at the receiver associated with the proximity sensor 810.

Computer

Figure 9:
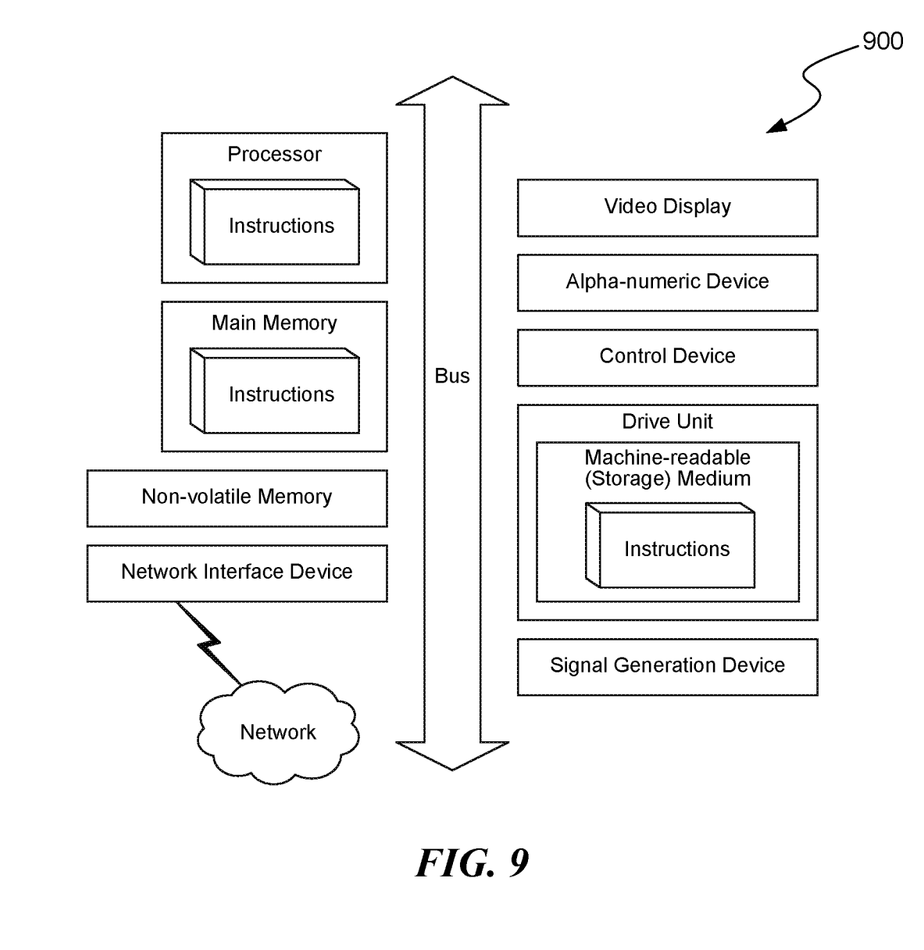
FIG. 9 is a diagrammatic representation of a mobile device in the example form of a computer system 900 within which the above-described apparatus may be implemented, and within which a set of instructions for causing the machine to perform any one or more of the methodologies or modules discussed herein may be executed.

FIG. 9 is a diagrammatic representation of a computer system 900 within which the above-described apparatus may be implemented, and within which a set of instructions for causing the machine to perform any one or more of the methodologies or modules discussed herein may be executed.

In the example of FIG. 9, the computer system 900 includes a processor, memory, non-volatile memory, and an interface device. Various common components (e.g., cache memory) are omitted for illustrative simplicity. The computer system 900 is intended to illustrate a hardware device on which any of the components described in the examples of FIGS. 1-8 (and any other components described in this specification) can be implemented. The computer system 900 can be of any applicable known or convenient type. The components of the computer system 900 can be coupled together via a bus or through some other known or convenient device.

This disclosure contemplates the computer system 900 taking any suitable physical form. As an example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a tablet, a personal digital assistant (PDA), a server, or a combination of two or more of these. Where appropriate, computer system 900 may include one or more computer systems 900; be unitary or distributed; span multiple locations; span multiple machines; or reside in a cloud, which may include one or more cloud components in one or more networks. Where appropriate, one or more computer systems 900 may perform, without substantial spatial or temporal limitation, one or more steps of one or more methods described or illustrated herein. As an example and not by way of limitation, one or more computer systems 900 may perform in real time or in batch mode one or more steps of one or more methods described or illustrated herein. One or more computer systems 900 may perform, at different times or at different locations, one or more steps of one or more methods described or illustrated herein, where appropriate.

The processor may be, for example, a conventional microprocessor such as an Intel® Pentium® microprocessor or Motorola PowerPC® microprocessor, or any type of microcontroller. One of skill in the relevant art will recognize that the terms "machine-readable (storage) medium" or "computer-readable (storage) medium" include any type of device that is accessible by the processor. The processor may be integrated with the camera, or may be integrated with the mobile device.

The memory is coupled to the processor by, for example, a bus. The memory can include, by way of example but not limitation, random-access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disc, a read-only memory (ROM), such as a CD-ROM, EPROM, or EEPROM, a magnetic or optical card, or another form of storage for large amounts of data. Some of this data is often written, by a direct memory access process, into memory during execution of software in the computer 900. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing an entire large program in memory may not even be possible. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register, readable by the processor.

The bus also couples the processor to the network interface device. The interface can include one or more of a modem or network interface. It will be appreciated that a modem or network interface can be considered to be part of the computer system 900. The interface can include an analog modem, ISDN modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 9 reside in the interface.

In operation, the computer system 900 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine, where the set of instructions causes the machine to perform any one or more of the methodologies or modules of the presently disclosed technique and innovation.

In general, the routines executed to implement the embodiments of the disclosure may be implemented as part of an operating system or a specific application, component, program, object, module, or sequence of instructions referred to as "'computer programs.'" The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally, regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical discs (e.g., Compact Disk Read-Only Memory (CD-ROMS), Digital Versatile Discs (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

Remarks

The language used in the specification has been principally selected for readability and instructional purposes, and it may not have been selected to delineate or circumscribe the inventive subject matter. It is therefore intended that the scope of the invention be limited, not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A port associated with a mobile device, the port comprising:
    an entry point is operable to receive a first light beam and operable to emit a second light beam;
    an exit point disposed inside the mobile device;
    a first pixel associated with a camera, the first pixel operable to turn on when the other pixels associated with the camera are turned off, the first pixel comprising:
        a light sensor in a plurality of light sensors associated with the camera, the light sensor operable to record an image, the light sensor associated with the exit point of the port;
        an ambient light sensor operable to detect a plurality of properties associated with the first light beam, the ambient light sensor associated with the exit point of the port; and
        a proximity sensor operable to detect a distance to an object, the proximity sensor associated with the exit point of the port, the proximity sensor comprising an emitter operable to emit the second light beam, and a receiver operable to receive a third light beam, the third light beam comprising the second light beam reflected off the object;
    a light guide operable to transmit the first light beam from the entry point of the port to the ambient light sensor, the light guide operable to transmit the first light beam from the entry point of the port to the receiver associated with the proximity sensor, and the light guide operable to transmit the second light beam from the emitter associated with the proximity sensor to the entry point of the port; and a processor operable to send a unique control signal to the first pixel, the unique control signal comprising an identification associated with the first pixel, and an instruction to operate at least one of the light sensor, the ambient light sensor or the proximity sensor associated with the first pixel.

2. The port of claim 1, the light guide comprising an optical fiber cable, a light pipe, or a liquid light guide.

3. The port of claim 1, the light guide comprising:

a first light guide comprising a first tunnel operable to transmit the first light beam from the entry point of the port to the ambient light sensor;

a second light guide comprising a second tunnel operable to transmit the second light beam from the emitter associated with the proximity sensor to the entry point of the port, and further the second tunnel operable to transmit the second light beam reflected off the object to the receiver associated with the proximity sensor.

4. The port of claim 3, the first light guide comprising a short focal length optical lens.

5. The port of claim 3, the second light guide comprising a long focal length optical lens.

6. The port of claim 1, the plurality of properties associated with the first light beam comprising a color associated with the first light beam, an intensity associated with the first light beam, a change in the color associated with the first light beam, and a change in the intensity associated with the first light beam.

7. The port of claim 1, the plurality of properties associated with the first light beam comprising a time of flight associated with the first light beam.

8. A method comprising:

providing an entry point associated with a first pixel in a plurality of pixels, the first pixel comprising a plurality of sensors comprising a light sensor, an ambient light sensor and a proximity sensor, the first pixel operable to turn on when the other pixels in the plurality of pixels are turned off, when the first pixel is turned on the first pixel is operable to receive a first light beam and the entry point is operable to emit a second light beam;

providing a processor operable to send a unique control signal to the first pixel, the unique control signal comprising an identification associated with the first pixel, and any one of an instruction to turn on or an instruction to turn off at least one of the plurality of sensors;

providing a light guide operable to transmit a beam of light between the entry point and an exit point, the light guide comprising a material that internally reflects light, the entry point disposed on an outer surface associated with a mobile device, the exit point disposed inside the mobile device; and configuring the plurality of sensors, coupled to the light guide, to detect a plurality of properties associated with the beam of light.

9. The method of claim 8, the plurality of sensors comprising at least two of a flash, a range finder, a fingerprint sensor, and a camera.

10. The method of claim 8, said providing the light guide comprising:

providing a first light guide comprising a first tunnel configured to transmit the first light beam from the entry point to a first sensor in the plurality of sensors; and providing a second light guide comprising a second tunnel configured to transmit the second light beam from an emitter associated with a second sensor in the plurality of sensors to the entry point.

11. The method of claim 10, said providing the second light guide further comprising configuring the second tunnel to transmit a third light beam from the entry point to a receiver associated with the second sensor in the plurality of sensors.

12. The method of claim 8, the light guide comprising any one of a short focal length optical lens, and a long focal length optical lens.

13. The method of claim 8, said the providing the light guide comprising:

disposing the light guide at a pixel on a camera associated with the mobile device.

14. The method of claim 8, the plurality of properties associated with the beam of light comprising a time of flight associated with the beam of light.

15. The method of claim 8, said providing the light guide further comprising:

configuring the light guide to transmit sound, the light guide comprising a second material that internally reflects sound.

16. The method of claim 15, the plurality of sensors comprising any of a speaker and a microphone.

* * * * *